United States Patent [19]
Hsu

[11] Patent Number: 6,073,077
[45] Date of Patent: Jun. 6, 2000

[54] METHOD FOR DETERMINING GRAVITY IN AN INERTIAL NAVIGATION SYSTEM

[75] Inventor: David Y. Hsu, Agoura Hills, Calif.

[73] Assignee: Litton Systems Inc., Woodland Hills, Calif.

[21] Appl. No.: 09/120,624

[22] Filed: Jul. 22, 1998

[51] Int. Cl.[7] .............................. G01C 21/00; G06G 7/78; G01S 3/02
[52] U.S. Cl. .......................... 701/220; 342/450; 342/462
[58] Field of Search .................................... 342/450, 457, 342/462; 701/220

[56] References Cited

U.S. PATENT DOCUMENTS 5,957,982  10/1999  Hughes et al. .............................. 701/13

*Primary Examiner*—Thomas H. Tarcza
*Assistant Examiner*—Fred H Mull
*Attorney, Agent, or Firm*—Robert E. Malm

[57] ABSTRACT

The invention is a method for determining gravity in an inertial navigation system which periodically produces and stores in memory position coordinates. The method comprises the steps of (a) retrieving the most recently determined position coordinates, (b) determining coordinates $L_u$, $L_n$, $H_u$, and $H_n$ from the position coordinates, $L_u$ and $L_n$ being predetermined functions of geodetic latitude and $H_u$ and $H_n$ being predetermined functions of geodetic altitude, (c) determining the vertical component of gravity by substituting either or both $L_u$ and $H_u$ in a first polynomial expression, (d) determining the north-south component of gravity by substituting either or both $L_n$ and $H_n$ in a second polynomial expression, and (e) utilizing the components of gravity determined in steps (c) and (d) in the next determination of the position coordinates.

13 Claims, 1 Drawing Sheet

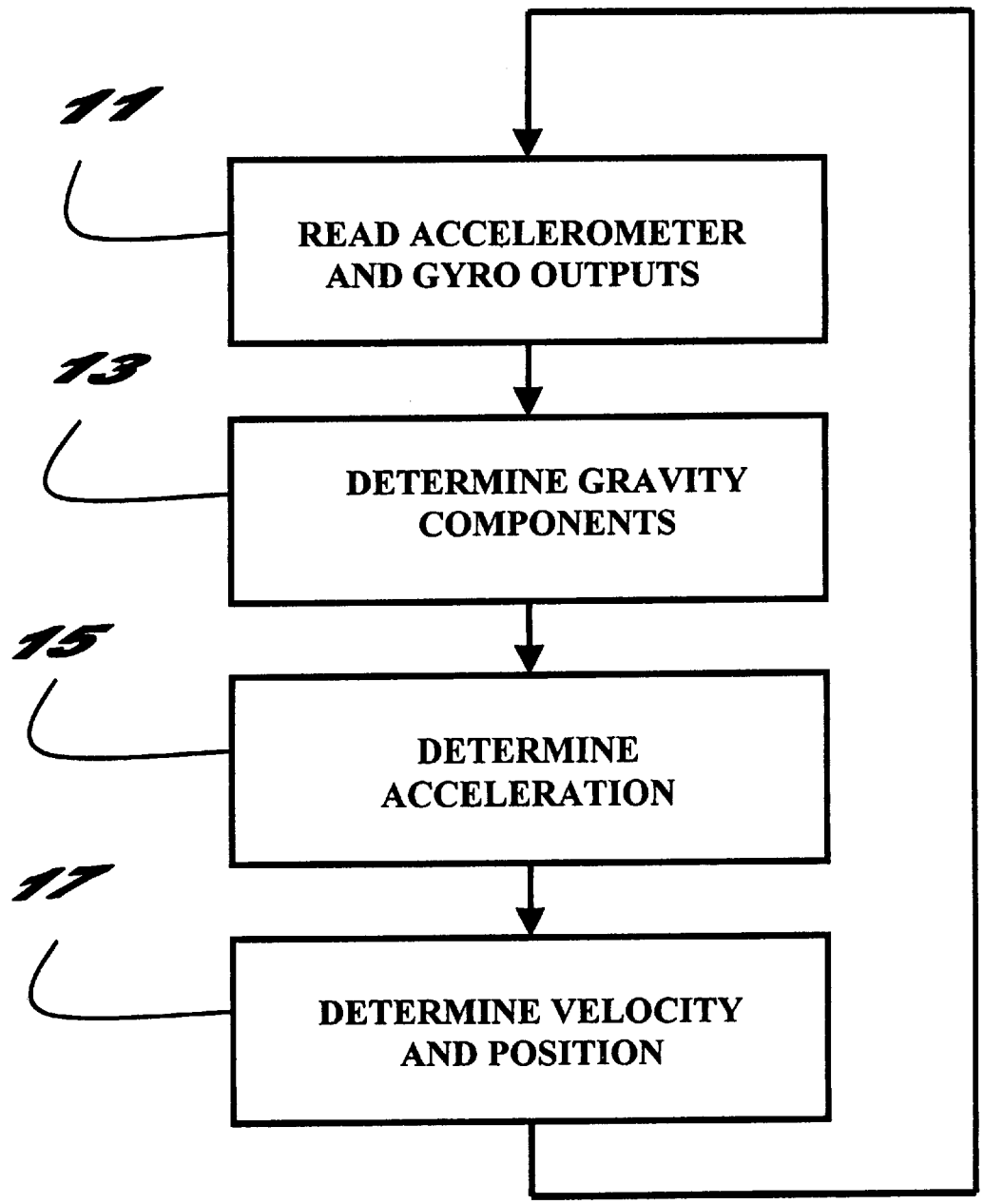

METHOD FOR DETERMINING GRAVITY IN AN INERTIAL NAVIGATION SYSTEM

CROSS REFERENCE TO RELATED APPLICATIONS (Not applicable)

STATEMENT REGARDING FEDERALLY SPONSORED RESEARCH AND DEVELOPEMENT (Not applicable)

BACKGROUND OF THE INVENTION

This invention relates generally to inertial navigation systems and more specifically to determining gravity in such systems.

The velocity $\vec{V}$ of interest in navigating a vehicle relative to the earth is defined by the equation $$\left(\frac{d\vec{V}}{dI}\right)_N = \vec{a}_{sf} + \vec{g}(\vec{R}) - \vec{\Omega} \times (\vec{\Omega} \times \vec{R}) - (\vec{\Omega} + \vec{\omega}) \times \vec{V} \quad (1)$$

where $$\left(\frac{d\vec{V}}{dI}\right)_N$$

is the rate of change of the vehicle's velocity relative to the earth expressed in a NAV (N) frame of reference (local-level with origin fixed at the center of the earth), $\vec{a}_s$ is the specific-force acceleration experienced by the inertial navigation system on board the vehicle, $\vec{g}$ is gravity, $\vec{\Phi}$ is the rotation rate of an earth-fixed frame of reference relative to an inertial frame (i.e. earth's rotation rate vector), $\vec{R}$ is the position vector of the vehicle from the center of the earth, and $\vec{\omega}$ is the rotation rate of the local-level frame relative to the inertial frame. In order to integrate $$\left(\frac{d\vec{V}}{dI}\right)_N$$

and obtain $\vec{V}$, an accurate expression for $\vec{g}$ is required.

The so-called normal gravity potential $\Phi$ (the most accurate gravity model presently available) is given in terms of ellipsoidal coordinates ($u,\beta,\lambda$) as $$\Phi = \frac{G_m}{c}\arctan\frac{c}{u} + \frac{q}{2q_0}\Omega^2 a^2\left(\sin^2\beta - \frac{1}{3}\right) + \frac{\Omega^2 v^2}{2}\cos^2\beta \quad (2)$$

and $$g_u = \frac{-1}{w}\left[\frac{G_m}{v^2} + \frac{\Omega^2 a^2 c q'}{q_0 v^2}\left(\frac{1}{2}\sin^2\beta - \frac{1}{6}\right) - \frac{\Omega^2 v^2}{2}\cos^2\beta\right] \quad (3)$$

$$g_\beta = \frac{-1}{w}\left(-\frac{\Omega^2 a^2 q}{q_0 v} + \Omega^2 v\right)\sin\beta\cos\beta \quad (4)$$

$$g_\lambda = 0 \quad (5)$$

$$c^2 = a^2 - b^2 \quad (6)$$

$$v^2 = u^2 + c^2 \quad (7)$$

$$w = \frac{\sqrt{u^2 + c^2\sin^2\beta}}{v} \quad (8)$$

$$q = \frac{1}{2}\left[\left(1 + \frac{3u^2}{c^2}\right)\arctan = \frac{c}{u} - \frac{3u}{c}\right] \quad (9)$$

$$q_0 = \frac{1}{2}\left[\left(1 + \frac{3b^2}{c^2}\right)\arctan\frac{c}{b} - \frac{3b}{c}\right] \quad (10)$$

$$q' = \frac{3v^2}{c^2}\left(1 - \frac{u}{c}\arctan\frac{c}{u}\right) - 1 \quad (11)$$

where $G_m$ is the earth's gravitational constant, $a$ is the semi-major axis of WGS-84 ellipsoid (DMA Technical Report, Department of Defense WGS-84, TR 8350.2), b is the semi-minor axis of WGS-84 ellipsoid, (e,n,u) are the vehicle coordinates in the NAV (N) frame (e-east, n-north, u-up), and $\Omega$ is the earth rotation rate.

Given the vehicle's location in geodetic coordinates ($\phi$, $\lambda$, h), the normal gravity vector expressed in the ECEF (earth-centered, earth-fixed) frame is given by $$\vec{g}^E = C_U^E \vec{g}^U \quad (12)$$

where $$C_U^E = \begin{bmatrix} u\cos\beta\cos\lambda/(wv) & -\sin\beta\cos\lambda/w & -\sin\lambda \\ u\cos\beta\sin\lambda/(wv) & -\sin\beta\sin\lambda/w & \cos\lambda \\ \sin\beta/w & u\cos\beta/(wv) & 0 \end{bmatrix} \quad (13)$$

is the transformation matrix from the ellipsoidal (U) frame to the ECEF (E) frame, and $\vec{g}^U$, the normal gravity vector, is expressed in ellipsoidal coordinates as $$\vec{g}^U = \nabla\Phi = \begin{bmatrix} \frac{1}{w}\frac{\partial\Phi}{\partial u} \\ \frac{1}{wv}\frac{\partial\Phi}{\partial \beta} \\ \frac{1}{v\cos\beta}\frac{\partial\Phi}{\partial \lambda} \end{bmatrix}^U = \begin{bmatrix} g_u \\ g_\beta \\ g_\lambda \end{bmatrix}^U \quad (14)$$

Note that u=b, q=$q_0$, v=a, and $g_\beta$=0 when h=0.

The normal gravity vector expressed in NAV (N) frame coordinates is given by $$\vec{g}^N = C_E^N \vec{g}^E = C_E^N C_U^E \vec{g}^U \quad (15)$$

where $$C_E^N = \begin{bmatrix} 0 & 1 & 0 \\ 0 & 0 & 1 \\ 1 & 0 & 0 \end{bmatrix}\begin{bmatrix} \cos\phi & 0 & \sin\phi \\ 0 & 1 & 0 \\ -\sin\phi & 0 & \cos\phi \end{bmatrix}\begin{bmatrix} \cos\lambda & \sin\lambda & 0 \\ -\sin\lambda & \cos\lambda & 0 \\ 0 & 0 & 1 \end{bmatrix} \quad (16)$$

To determine the normal gravity vector at the vehicle's location expressed in NAV-frame coordinates, one first transforms to geodetic coordinates, then to ECEF coordinates, and finally to ellipsoidal coordinates. The geodetic-to-ECEF transformation is defined by the equations $$x=(N+h)\cos\phi\cos\lambda$$
$$y=(N+h)\cos\phi\sin\lambda$$
$$z=(Nb^2/a^2+h)\sin\phi \quad (17)$$

where $$N = \frac{a^2}{\sqrt{a^2\cos^2\phi + b^2\sin^2\phi}} \quad (18)$$

The transformation to ellipsoidal coordinates is defined by the equations $$u^2 = \frac{1}{2}\left[r^2 - c^2 + \sqrt{(r^2-c^2)^2 + 4c^2z^2}\right] \quad (19)$$

$$\beta = \arctan\left(\frac{zv}{u\sqrt{x^2+y^2}}\right)$$

$$\lambda = \arctan\left(\frac{y}{x}\right)$$

where $$r^2 = x^2 + y^2 + z^2 \quad (20)$$

When the vehicle's position in ellipsoidal coordinates has been determined, then the normal gravity vector in ellipsoidal coordinates can be calculated. The final step is to transform the normal gravity vector from ellipsoidal coordinates to NAV-frame coordinates using the equations presented above.

To simplify the process of determining the gravity vector, the so-called $J_2$ gravity model is utilized in present-day inertial navigation systems. The $J_2$ gravity model can be expressed in rectangular ECEF coordinates and thereby greatly reduces the computational load associated with determining the gravity vector at a vehicle's location. Unfortunately, the cost of this reduction is a reduction in accuracy of the gravity vector.

A need exists for a gravity-determining procedure which provides the accuracy of the normal model and can be implemented with currently-available inertial navigation system processors.

BRIEF SUMMARY OF THE INVENTION

The invention is a method for determining gravity in an inertial navigation system which periodically produces and stores in memory position coordinates. The method comprises the steps of (a) retrieving the most recently determined position coordinates, (b) determining expressions $L_u$, $L_n$, $H_u$, and $H_n$ from the position coordinates, $L_u$ and $L_n$ being predetermined functions of geodetic latitude and $H_u$ and $H_n$ being predetermined functions of geodetic altitude, (c) determining the vertical component of gravity by substituting either or both $L_u$ and $H_u$ in a first polynomial expression, (d) determining the north-south component of gravity by substituting either or both $L_n$ and $H_n$ in a second polynomial expression, and (e) utilizing the components of gravity determined in steps (c) and (d) in the next iteration of position determination.

BRIEF DESCRIPTION OF THE DRAWINGS

The FIGURE shows a simplified flow diagram which describes the steps performed by the digital processor in an inertial navigation system in obtaining a vehicle's velocity and position.

DETAILED DESCRIPTION OF THE INVENTION

In the preferred embodiment of the invention, the gravity vector is an approximation to the normal gravity model defined by the equations $$\hat{g}_n = D_{11} h \sin(2\phi)$$

$$\hat{g}_u = (C_{22}\sin^4\tau + C_{12}\sin^2\tau + C_{02})h^2 + (C_{21}\sin^4\tau + C_{11}\sin^2\tau + C_{01})h + (C_{20}\sin^4\tau + C_{10}\sin^2\tau + C_{00}) \quad (21)$$

The quantity $\tau$ is the eccentric latitude and is related to the geodetic latitude by the equation $$\tan\tau = \frac{b}{a}\tan\phi \quad (22)$$

The coefficients $D_{11}$, $C_{00}$, $C_{10}$, $C_{20}$, $C_{01}$, $C_{11}$, $C_{21}$, $C_{02}$, $C_{12}$, and $C_{22}$ are determined by fitting the above equations to the normal gravity model in the least square error sense. If 18,281 points are used ($\tau$: 1° increments from −90° to 90°; h: 1000 ft increments from 0 ft to 100,000 ft), the following values for the coefficients are obtained:

$D_{11} = -2.475\ 925\ 058\ 626\ 642\times10^{-9}$  $C_{11} = -1.347\ 079\ 301\ 177\ 616\times10^{-9}$ $C_{00} = -9.780\ 326\ 582\ 929\ 618$  $C_{12} = 1.878\ 969\ 973\ 008\ 548\times10^{-16}$ $C_{01} = 9.411\ 353\ 888\ 873\ 278\times10^{-7}$  $C_{20} = 1.188\ 523\ 953\ 283\ 804\times10^{-4}$ $C_{02} = -6.685\ 260\ 859\ 851\ 881\times10^{-14}$  $C_{21} = 3.034\ 117\ 526\ 395\ 185\times10^{-12}$ $C_{10} = -5.197\ 841\ 463\ 945\ 455\times10^{-2}$  $C_{22} = 1.271\ 727\ 412\ 728\ 199\times10^{-18}$ A comparison of the accuracies of the invention and the use of the $J_2$ gravity model in approximating the normal gravity model for the 18,281 (101×181) grid points is shown below in units of $\mu$g's (1 $\mu$g=980.6194 cm/s$^2\times10^{-6}$).

|  | North-South Component | |
| --- | --- | --- |
|  | Invention | $J_2$ gravity model |
| RMS Error | 0.00767 | 3.79994 |
| MAX Error | 0.02540 | 6.36700 |
| MIN Error | −0.02540 | −6.36700 |

|  | Vertical Component | |
| --- | --- | --- |
|  | Invention | $J_2$ gravity model |
| RMS Error | 0.00900 | 5.58837 |
| MAX Error | 0.02770 | 5.13470 |
| MIN Error | −0.02730 | −12.07440 |

The implementation of the invention is shown in the FIGURE which shows a simplified software flow diagram associated with the digital processor of an inertial navigation system. In step 11, the accelerometers and gyro outputs are read. In step 13, the components of gravity are determined using the polynomial expressions given above. In step 15, the acceleration of the vehicle is determined by adding to the components of gravity the specific-force acceleration components derived from the measurements supplied by the accelerometers. Finally, in step 17, the velocity and position of the vehicle are determined by updating the previous values. The process then repeats.

What is claimed is:

1. A method for determining gravity in an inertial navigation system, the inertial navigation system periodically producing and storing in memory position coordinates, the method comprising the steps:

(a) retrieving the most recently determined position coordinates;

(b) determining coordinates $L_u$, $L_n$, $H_u$, and $H_n$ from the position coordinates, $L_u$ and $L_n$ being predetermined functions of geodetic latitude and $H_u$ and $H_n$ being predetermined functions of geodetic altitude;

(c) determining the vertical component of gravity by substituting either or both $L_u$ and $H_u$ in a first polynomial expression;

(d) determining the north-south component of gravity by substituting either or both $L_n$ and $H_n$ in a second polynomial expression;

(e) utilizing the components of gravity determined in steps (c) and (d) in the next determination of the position coordinates.

2. The method of claim 1 wherein $L_u$ is a function of the eccentric latitude, the eccentric latitude being a function of the geodetic latitude.

3. The method of claim 1 wherein $L_u$ is the square of the sine of the eccentric latitude, the eccentric latitude being a function of the geodetic latitude.

4. The method of claim 1 wherein the first polynomial expression contains terms up to and including the second order in $L_u$.

5. The method of claim 1 wherein $H_u$ is geodetic altitude.

6. The method of claim 1 wherein the first polynomial expression only contains terms up to and including the second order in $H_u$.

7. The method of claim 1 wherein $L_n$ is the sine of twice the geodetic latitude.

8. The method of claim 1 wherein the second polynomial expression only contains terms up to and including the second order in $L_n$.

9. The method of claim 1 wherein the second polynomial expression only contains terms up to and including the first order in $L_n$.

10. The method of claim 1 wherein $H_n$ is geodetic altitude.

11. The method of claim 1 wherein the second polynomial expression only includes terms up to and including the second order in $H_n$.

12. The method of claim 1 wherein the second polynomial expression only includes terms up to and including the first order in $H_n$.

13. The method of claim 1 wherein the second polynomial expression consists of a single term containing the product of $L_n$ and $H_n$.

* * * * *